May 16, 1967     I. L. ADAMS     3,319,864
APPARATUS FOR FEEDING AND FASTENING CLIPS
Filed May 19, 1965     2 Sheets-Sheet 1
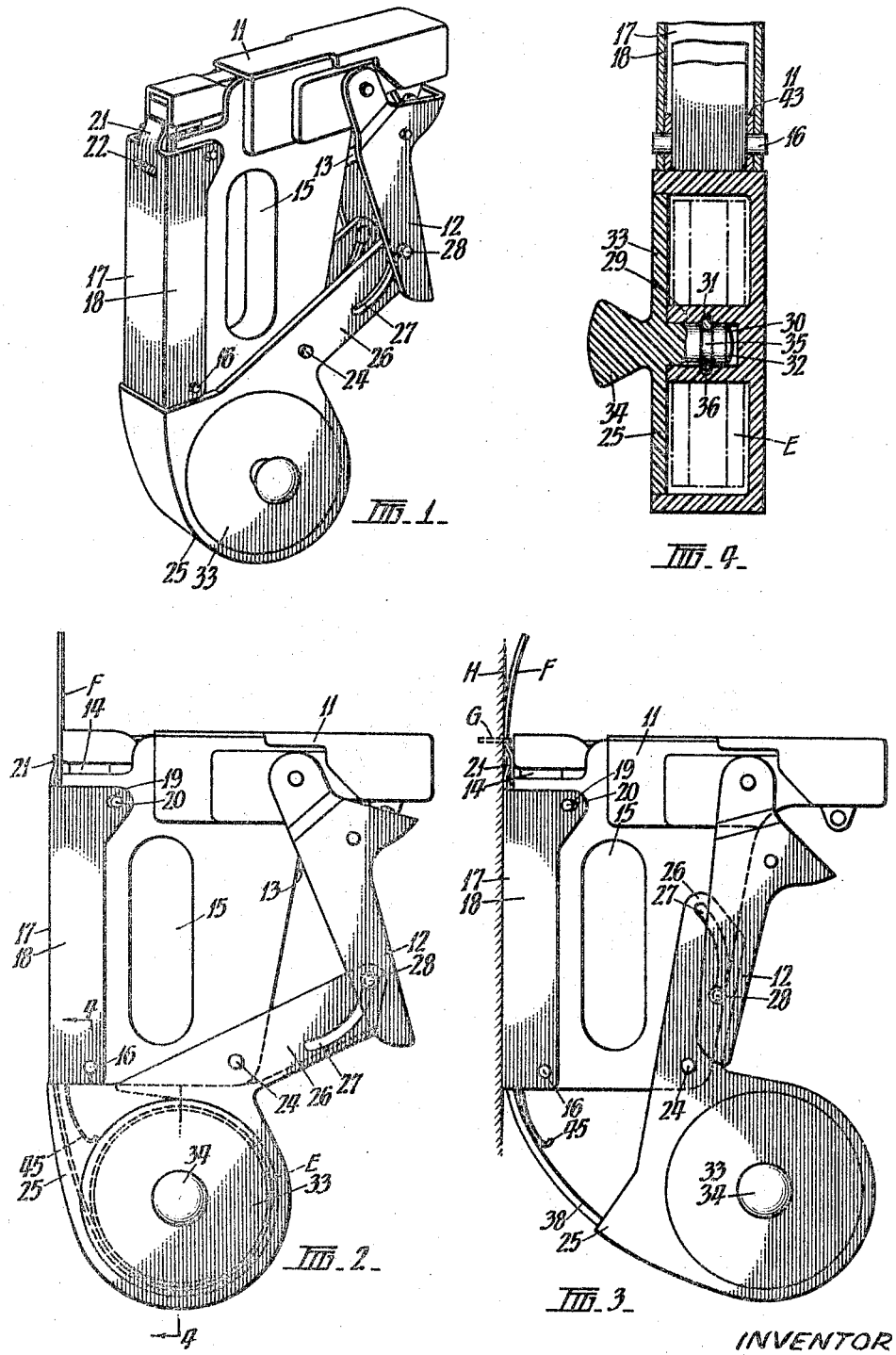
INVENTOR:
IAN LEONARD ADAMS
BY
Oberlin, Maky & Donnelly
ATTORNEYS

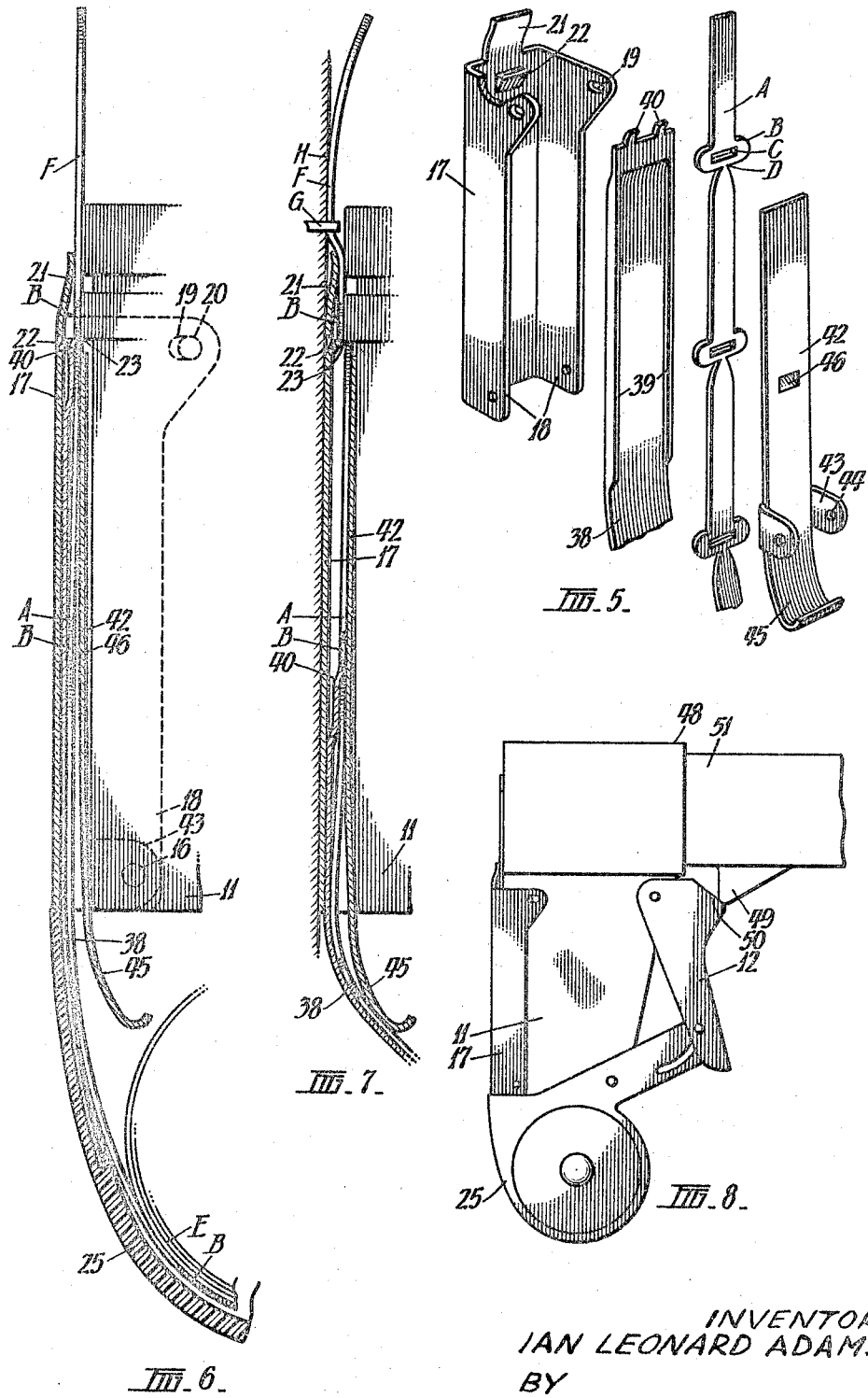

United States Patent Office 3,319,864
Patented May 16, 1967

3,319,864
APPARATUS FOR FEEDING AND FASTENING
CLIPS
Ian Leonard Adams, South Blackburn, near Melbourne,
Victoria, Australia, assignor to John Royston Siddons,
Lower Plenty, Victoria, Australia
Filed May 19, 1965, Ser. No. 457,075
Claims priority, application Australia, May 22, 1964,
44,836/64
7 Claims. (Cl. 227—76)

This invention relates as indicated to apparatus for feeding and fastening clips, such as wiring clips, and refers particularly, but not exclusively, to the fastening in position of clips of the "tongue and buckle" type such as are used extensively in fastening electric cables in position.

Clips of a type known as "tongue-and-buckle" clips are used extensively for fastening electric cables in position. These clips are usually made of thin sheet brass, or aluminium, and each clip has a head provided with a transverse slot and, extending from the head, a tongue which is of a width adapted to fit slidably through the slot, so that the tongue can be bent into a loop (fitting about an electric cable), engaged in the slot and then bent back to hold the cable in position. These clips are secured in position by nailing, a nail being fitted through a hole in the tongue and nailed into a support.

Until recent years the general practice was to make the clips with a hole to receive the nail, so that a technician was obliged to place the nail in the hole and then hammer the nail into a support. This form of the clip has been largely superseded by clips made in strip form with each clip having a nail secured to it. With this form of wiring clip the technician can hold the strip of clips so that the front clip is in desired position, hammer the nail of that clip into the support and then, with a simple twisting movement, break the remainder of the strip away from the front clips.

By use of those strips of clips the technician can retain the hammer in his hand, as the clips and their nails are already fastened together, and the speed of fastening the wiring clips in position is much greater than it is when the clips and nails are provided separately.

However, it is necessary for the technician to use both hands in fastening a run of such clips—one hand holding the strip of clips and the other hand holding his hammer.

With the above in mind, a primary object of the present invention is to provide an apparatus by means of which clips such as the aforementioned wiring clips may be readily and conveniently fastened in position by one-handed operation.

A further, more specific object of the invention is to provide such an apparatus wherein the clips are automatically fed seriatim to a position for engagement by a suitable fastening means, such as a nail or a staple, with the leading clips when in such position being severed from the clip strip just prior to the fastening of the clip to the support surface.

Another object of the present invention is to provide such an apparatus in which strip retaining means are provided for preventing back-feeding of the strip while the leading clip is severed and fastened.

A still further object of the invention is to provide an apparatus including clip feeding means operatively connected to the fastener drive means for automatically conditioning the clip feeding means for advancing the succeeding clip at the termination of the fastening of the leading clip to the adjacent support surface.

These and other objects of the present invention will become apparent as the following description proceeds.

In order that the invention may be fully understood and readily put into practical form I shall now describe, with reference to the accompanying illustrative drawings, a preferred construction of apparatus made according to the invention and a modification thereof. In these drawings:

FIGURE 1 is a perspective view of the apparatus;
FIGURE 2 shows the apparatus in side elevation, ready for operation;
FIGURE 3 is a view similar to FIGURE 2 but showing the apparatus immediately after operation;
FIGURE 4 shows a cross-sectional view, the cross-section being on the line and in the direction of the arrows 4—4 of FIGURE 2;
FIGURE 5 illustrates parts for guiding and feeding a strip of clips to position for stapling;
FIGURES 6 and 7 are somewhat diagrammatic views illustrating the operation of the clip feeding and cutting-off means; and
FIGURE 8 illustrates the manner in which apparatus according to this invention may be used in association with powder-powered fastening tools.

The apparatus illustrated in FIGURES 1 to 7 includes a stapling device of known type having a body 11 on which is pivotally mounted an actuating lever 12 connected to a rod 13 adapted to actuate spring means operating the blade for driving the staples, which are housed in a magazine 14. The body 11 has a finger opening 15 to enable the device to be gripped.

Pivotally mounted by a pin 16 on the rear end part of the body 11 is a guide member 17 of channel shape, having substantially parallel sides 18 which fit on opposite sides of the body 11. In the front end part of each of the sides 18 is a slot 19, and the guide member is held on the body 11 by a pin 20 engaging in said slots 19 so as to permit the guide member 17 to have a limited pivotal movement. At the front end of the member 17 is a tongue 21 adapted to press upon a clip (when the front end of the guide member is pressed towards the body 11) and hold it firmly in position, and a short distance rearwardly of that tongue is a cutter blade 22 struck out from the plane of the guide member 17 adapted to co-act with a part 23 of the stapling device and to cut a narrow neck joining two adjacent wiring clips.

Those wiring clips are illustrated in FIGURE 5 and it will be seen that they are of the tongue and buckle type, made in strip form. Each clip has a tongue A and head B with slot C thereon, and each clip is joined to the next adjacent clip by a narrow neck D. The blade 22 is adapted to sever the neck D of each clip after it has come into position.

Also mounted pivotally on the rear end part of the body 11, at 24, is a reel holder 25 having two side plate extensions 26 with arcuate slots 27 therein. Studs 28 fitted to the actuating lever 12 engage in those slots 27 so that upon movement of the lever 12 the reel holder 25 is caused to turn about its fulcrum 24, reference being made to FIGURES 2 and 3. Within the reel holder 25 is a boss 29 on which a reel of the clips may be fitted, and said boss 29 has a co-axial bore 30 provided with an internal groove 31 adapted to receive the stem 32 of a removable cover plate 33 having a finger piece 34 on its outer side. That stem 32 has a recess 35 at a location corresponding to the groove 31 and a circlip 36 is fitted in said groove 31 so as to be engageable in the recess 35 to hold the cover plate 33 in position.

Moulded onto the front part of the reel holder 25 is a feed blade 38 having two shallow side flanges 39 adapted to fit slidably between the sides 18 of the guide member 17 and a flexible rear end part. The side flanges 39 are a distance apart such that the wiring clips can move slidably between them. At the front of the blade 38 are two fingers 40 which are so spaced that they can engage on opposite sides of a tongue A of a clip. Those fingers 40 are adapted to grip behind the head B of the clip which is to be moved to operative position—as shown in FIGURE 6—when the cutter blade 22 of the guide member can fit between them to sever the neck D joining that clip to the next succeeding clip.

It will be apparent that when the reel holder 25 is moved from the position shown in FIGURE 2 to that depicted in FIGURE 3 the feed blade 38 will be drawn rearwardly, and that the extent of pivotal movement of the reel holder will require to be such that the fingers 40 will move from engagement behind the head of the front wiring clip to a position behind the head B of the next succeeding clip so as to be capable of engagement therewith.

A clip retaining member 42 is also fitted to the body member 11. Said member 42 has two arms 43 spaced apart to fit on opposite sides of the body member 11 and said arms are provided with holes 44 near their outer ends to be engaged by the pin 16. The rear end part 45 of the member 42 is shaped to assist in guiding the wiring clips from the reel holder 25 into the guide member 17, and at about the middle of the length of the member 42 there is a tongue 46 struck from the plane of the member 42 and of a width capable of engaging readily in the slots C of the wiring clips and length such that it will engage in the slots C of successive clips and hold them against rearward movement when the feed blade 38 is being drawn rearwardly.

Thus, the wiring clips are caused to move forwardly by the feed blade 38 and are held against rearward movement by the clip retaining member 42.

In order to operate the apparatus a reel E, having a desired number of the clips F in strip form (connected together in head-to-foot arrangement), is fitted on the boss 29 of the reel holder 25, the front clip of the reel is fed between the guide 42 and the feed blade 38, and the cover 33 is replaced so as to hold the reel E in position. In feeding the clips F between the guide 42 and the feed blade 38 care is taken to ensure that the first of the clips passes the fingers 40 so that said fingers will then be able to grip behind the head B of said first clip. The reel holder 25 is then moved so that the first of the clips is moved to a position as shown in FIGURES 2 and 6, with the head B of the clip rearwardly of the blade for driving the staples.

As the clips move past the tongue 46 of the clip retaining member 42 said member pivots a short angular distance to enable the clips to slide past the tongue 46 and then returns to a position during the driving of the staple, wherein the tongue 46 engages in the slot C of the second clip F. Also, the feed blade 38 can swing outwardly a short distance to enable the head B of the first clip F to travel past the fingers 40.

When the first clip has been fed to the position illustrated in FIGURE 2 the apparatus is then ready for use, and it is operated by pressing the tool against the surface H to which the first clip is to be fastened, thereby causing the guide member 17 to pivot a short distance about the pin 16 in a direction towards the body member 11. By reason of that movement the cutter blade 22 is caused to cut the neck D joining the first and second clips, as shown in FIGURE 7.

The application of sufficient pressure to the actuating lever 12 will cause that lever to operate the stapling device, and a staple G is driven into the surface H to which the first clip is to be fastened. It will be found that the pressure of the tongue 21 upon the head part of the first clip will cause that part to be bent outwardly from that surface.

The pivotal movement of the lever 12 also causes the reel holder 25 to swing back, as shown in FIGURE 3, drawing the feed blade 38 rearwardly. Then, when the tool is lifted away from the surface H the clip retaining member 42 pivots a short distance outwardly of the body member 11 to engage the slot C of the second clip F and hold said second clip against movement, and also to press the tongue A of said second clip outwardly to clear the anvil part 23. When actuating pressure upon the lever 12 is released said lever returns to its initial position, as shown in FIGURE 2, and the reel holder 25 is swung down to press the feed blade 38 forwardly, driving the second clip F into position ready for use.

When the reel E of clips has been exhausted the cover 33 may be removed from the reel holder and a fresh reel E placed in position.

It is preferred that the number of clips in the reel be the same as the number of staples in a block of staples placed in the magazine 14 so that the supply of staples will be exhausted at the same time as the supply of clips F.

It will be found that use of the apparatus provided by this invention will lead to the rapid fastening in position of a run of the wiring clips F with a relatively small amount of effort. Also, the tool will be found to be very convenient to operate.

In the modified form of the apparatus illustrated in FIG. 8, a commercially available nail-applying tool, illustrated diagrammatically at 48, is incorporated with the apparatus previously described in lieu of the stapling means, with the clips in this form of the invention being formed with holes in the tongues A to receive the nails driven by the tool. As noted, the tool is a conventional, commercially available type and need not be specifically described or illustrated for a full understanding of the present invention. The FIG. 8 form of the invention includes the previously described reel means, clip feeding and retaining means as specifically illustrated in FIGS. 1–7, and the structural details of these particular members have not been repeated in FIG. 8.

The nail-applying tool 48 is securely mounted on the body member 11 and includes a barrel 51 slidable within the head part secured to the body. On the barrel 51 is a projection 49 adapted to engage with a cam surface 50 on the actuating lever 12, the parts being so constructed that when the barrel 51 is pressed forwardly relative to the head part of the tool 48 to cause a nail to be driven through a wiring clip and into the surface to which said clip is to be fastened, the projection 49 will cause the lever 12 to turn whereby the reel holder 25 is swung back ready to effect the feed of another clip into position ready for use, and when the barrel 51 is retracted such feed is effected.

The nail-applying tool 48 is preferably of the type powered by actuating an explosive mixture and is particularly suitable for use in driving fasteners, for example nails, into concrete or metal. The FIG. 8 form of the invention is thus particularly well suited to drive a series of wiring clips along and into a concrete wall.

It will be apparent that there may be devised many modifications in details of design and construction. Thus, the means for feeding the clips sequentially into position may be modified, as may be the means for separating the first clip from the remainder of the clips in the supply and the means for holding the supply of the clips. The clips may be supplied in a magazine of separate or individual clips—instead as a reel of clips in strip form—with the feeding means sliding the clips sequentially to position ready for use.

All such modifications are to be deemed to be included within the scope of the invention as defined by the appended claims.

What I claim is:

1. Apparatus for fastening wiring clips in position comprising a body member, means on the body member for holding a supply of staples, means for driving said staples into a support, means on the body member for holding a supply of wiring clips comprising a reel holder pivotally mounted on said body member, said means for driving said staples including means for pivoting said reel holder, a feed blade operatively connected to said reel holder and adapted upon pivotal movement of the latter relative to the body to feed a wiring clip to a position whereat such clip may be attached to said support by a staple driven by said staple driving means.

2. Apparatus according to claim 1 wherein the means for pivoting said reel holder includes an actuating lever mounted pivotally on the body member, said actuating lever being operatively connected to the reel holder and effective upon operation of the staple driving means to swing the reel holder pivotally to a position ready to effect the feed of a wiring clip to a position under said staple driving means.

3. Apparatus for fastening wiring clips in position comprising a body member, means on said body member for holding a supply of fasteners, means for driving said fasteners into a support, means on said body member for holding a supply of wiring clips comprising a reel holder pivotally mounted on said body member and having arm means extending therefrom, an actuating lever mounted pivotally on said body member, said arm means being connected to said actuating lever whereby movement of the latter causes the reel holder to pivot on said body member, a guide member mounted pivotally on said body member and adapted to have limited pivotal movement, a feed blade mounted on said reel holder and slidable within said guide member, means on said feed blade adapted to engage and advance wiring clips seriatim to a position to be fastened, clip retaining means within the guide member adapted to engage said wiring clips to prevent backfeeding of the same, said feed blade being adapted to be moved forwardly to feed a clip into position for engagement by a fastener driven by said fastener driving means when said actuating lever is returned to an inoperative position and being adapted to be retracted to grip another clip simultaneously with the driving of the fastener into the first mentioned clip by said actuating lever.

4. The combination of claim 3 wherein the guide means has a cutter blade adapted to co-act with an anvil formed on said body member to sever the first mentioned clip from said supply of clips.

5. The combination of claim 3 wherein arcuate slots are formed in said arm means, and said actuating lever is provided with studs movable in said arcuate slots thereby to permit relative vertical movement between said arm means and said lever.

6. Apparatus for fastening wiring clips, comprising a body member, reel means pivotally connected to said body member for holding a supply of wiring clips, clip feeding means carried by said reel means operative to feed said clips seriatim to a position to receive fastener means, means comprising a nail driving tool mounted on said body member, said tool including a head part and a barrel member linearly slidable therewithin for driving a fastener through a properly positioned clip, means for severing a single such clip from the remaining supply of clips, and means interconnecting said barrel and said reel means for retracting said clip feeding means responsive to actuation of said barrel to drive a nail thereby to condition said clip feeding means for the advancing of the succeeding clip.

7. The combination of claim 6 wherein said interconnecting means comprises a handle pivotally interconnected to such body member and to said reel means, and means projecting from said barrel engageable with said handle for pivoting said reel means.

References Cited by the Examiner
UNITED STATES PATENTS

| | | | |
|---|---|---|---|
| 1,049,509 | 1/1913 | Moore | 93—88 |
| 2,042,816 | 6/1936 | Whitman | 93—88 |
| 2,351,557 | 6/1944 | Swett et al. | 227—76 X |
| 2,996,720 | 8/1961 | Mackechnie | 227—76 |

GRANVILLE Y. CUSTER, Jr., *Primary Examiner.*